United States Patent
Shen (10) Patent No.: US 10,429,198 B2
(45) Date of Patent: Oct. 1, 2019

(54) INTELLIGENT FUEL PROMPT DEVICE AND METHOD

(71) Applicant: BOE TECHNOLOGY GROUP CO., LTD., Beijing (CN)

(72) Inventor: Chenyin Shen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 63 days.

(21) Appl. No.: 15/540,245

(22) PCT Filed: Nov. 4, 2016

(86) PCT No.: PCT/CN2016/104540
§ 371 (c)(1),
(2) Date: Jun. 27, 2017

(87) PCT Pub. No.: WO2017/128798
PCT Pub. Date: Aug. 3, 2017

(65) Prior Publication Data
US 2018/0087916 A1    Mar. 29, 2018

(30) Foreign Application Priority Data
Jan. 26, 2016 (CN) .......................... 2016 1 0051628

(51) Int. Cl.
*G01C 21/34* (2006.01)
*G01C 21/36* (2006.01)
(Continued)

(52) U.S. Cl.
CPC ..... *G01C 21/3469* (2013.01); *G01C 21/3492* (2013.01); *G01C 21/3667* (2013.01);
(Continued)

(58) Field of Classification Search
CPC ............ G01C 21/3492; G01C 21/3667; G01C 21/3679; G01C 21/3691; G08G 1/0967;
(Continued)

(56) References Cited

U.S. PATENT DOCUMENTS

| 5,608,635 A | 3/1997 | Tamai |
| 2010/0138141 A1 | 6/2010 | Hayashida et al. |
| 2014/0052374 A1* | 2/2014 | Hoch .................. G01C 21/343 701/533 |

FOREIGN PATENT DOCUMENTS

| CN | 101526362 A | 9/2009 |
| CN | 201476793 U | 5/2010 |

(Continued)

OTHER PUBLICATIONS

Office Action received for Chinese Patent Application No. 201610051628.3, dated Oct. 30, 2017, 16 pages (8 pages of English Translation and 8 pages of Office Action).
(Continued)

*Primary Examiner* — Maceeh Anwari
(74) *Attorney, Agent, or Firm* — Womble Bond Dickinson (US) LLP (57) ABSTRACT

The disclosure provides an intelligent fuel prompt device and method, wherein the device comprises a fuel quantity sensor configured to obtain fuel consumption information of a vehicle; a GPS module configured to obtain position information of the vehicle; a central processing unit configured to obtain reachable range information of the vehicle according to the position information and fuel consumption information of the vehicle; and a prompt module configured to prompt with respect to the reachable range information of the vehicle. As such, a user can be fully aware of the distance that the vehicle can travel with the remaining fuel quantity, and effective prompt of the fuel quantity is realized.

11 Claims, 4 Drawing Sheets

(51) Int. Cl.
  *G08G 1/0967* (2006.01)
  *G08G 1/0968* (2006.01)
(52) U.S. Cl.
  CPC ..... *G01C 21/3679* (2013.01); *G01C 21/3691* (2013.01); *G08G 1/0967* (2013.01); *G08G 1/09685* (2013.01); *G08G 1/096827* (2013.01); *G08G 1/096833* (2013.01); *G08G 1/096866* (2013.01)
(58) Field of Classification Search
  CPC ....... G08G 1/096827; G08G 1/096833; G08G 1/09685; G08G 1/096866
  USPC .......................................................... 701/423
  See application file for complete search history.

(56) References Cited

FOREIGN PATENT DOCUMENTS

| CN | 101813482 A | | 8/2010 |
|---|---|---|---|
| CN | 102211582 A | | 10/2011 |
| CN | 202350795 U | | 7/2012 |
| CN | 202757624 U | | 2/2013 |
| CN | 103047991 A | | 4/2013 |
| CN | 103064099 A | | 4/2013 |
| CN | 103245350 A | | 8/2013 |
| CN | 103443588 A | | 12/2013 |
| CN | 103791961 A | | 5/2014 |
| CN | 104515526 A | * | 4/2015 |
| CN | 104515526 A | | 4/2015 |
| CN | 104848868 A | | 8/2015 |
| CN | 105509759 A | | 4/2016 |
| WO | 2009/025359 A1 | | 2/2009 |

OTHER PUBLICATIONS

International Search Report and Written Opinion in PCT/CN2016/104540 dated Jan. 25, 2017, with English translation.
Office Action received for Chinese Patent Application No. 201610051628.3, dated Aug. 2, 2018, 15 pages (8 pages of English Translation and 7 pages of Office Action).
International Preliminary Report on Patentability received for PCT Patent Application No. PCT/CN2016/104540, dated Aug. 9, 2018, 16 pages (10 pages of English Translation and 6 pages of Original Document).

* cited by examiner

INTELLIGENT FUEL PROMPT DEVICE AND METHOD

RELATED APPLICATION

The present application is the U.S. national phase entry of PCT/CN2016/104540, with an international filing date of Nov. 4, 2016, which claims the benefit of Chinese Patent Application No. 201610051628.3, filed on Jan. 26, 2016, the entire disclosures of which are incorporated herein by reference.

TECHNICAL FIELD

The present disclosure relates to the technical field of vehicle fuel prompt, in particular to intelligent fuel prompt device and method for use in a vehicle.

BACKGROUND

With the progress of science and technology, motor vehicles become increasingly high-tech. Currently, many new cars are equipped with onboard computers, and one of the main functions of such onboard computer is to provide a display of the fuel consumption so that a car owner can learn information about the fuel and fuel consumption of the vehicle.

However, a conventional fuel prompt system can only give a prompt of the currently remaining fuel quantity, while it cannot provide information about a reachable range of the vehicle based on the remaining fuel quantity, so it cannot help to avoid running out of fuel in places with sparse gas stations.

SUMMARY

The present disclosure provides an intelligent fuel prompt device and method, which can solve the problems in the prior art that information of the reachable range of a vehicle based on the remaining fuel quantity cannot be prompted and thus effective prompt with respect to the fuel quantity cannot be realized.

According to a first aspect of the present disclosure, an intelligent fuel prompt device for a vehicle is provided, comprising: a fuel quantity sensor configured to obtain fuel consumption information of a vehicle; a GPS module configured to obtain position information of the vehicle; a central processing unit configured to obtain reachable range information of the vehicle according to the position information and fuel consumption information of the vehicle; and a prompt module configured to prompt with respect to the reachable range information of the vehicle.

Optionally, said device further comprises a gas station information module configured to obtain position information of gas stations;

wherein the central processing unit is further configured to determine whether the vehicle can reach a nearest gas station based on the position information of the gas stations and the reachable range information of the vehicle.

Optionally, the prompt module is further configured to prompt a user when the vehicle cannot reach the nearest gas station.

Optionally, said device further comprises a wireless communication module configured to obtain position information of gas stations in real time and send said position information of gas stations to the gas station information module.

Optionally, the wireless communication module is further configured to obtain road-related information and send said road-related information to the central processing unit;

the central processing unit is further configured to obtain the reachable range information of the vehicle based on the position information and the fuel consumption information of the vehicle as well as the road-related information; and determine whether the vehicle can reach a nearest gas station based on the position information of the gas stations and the reachable range information of the vehicle.

Optionally, the central processing unit is configured to:

obtain a driving distance $\Delta d$ of the vehicle in a preset period of time, fuel consumption information $\Delta g$ in said preset period of time, and a road-related coefficient j of the current road section, and calculate a current specific fuel consumption from equation 1:

$$h = \Delta g / \Delta d / j \qquad \text{equation 1;}$$

obtain the reachable range information of the vehicle according to said specific fuel consumption, said position information of the vehicle and said road-related coefficient using equation 2:

$$h * \Sigma_{i=n}^{1} d_i * j_i = g \qquad \text{equation 2;}$$

wherein, h is the current specific fuel consumption, g is a total amount of the remaining fuel, $d_i$ is a distance that the vehicle can travel on each section of the road, wherein the road is divided into i sections according to the road-related coefficient, $1 \leq i \leq n$ and is an integer, $n \geq 1$ and is an integer, $j_i$ is the road-related coefficient of each section of the road.

Optionally, the road-related coefficient is a congestion coefficient or a speed limit coefficient.

According to a second aspect of the present disclosure, an intelligent fuel prompt method for a vehicle is provided, comprising:

obtaining fuel consumption information and position information of a vehicle;

obtaining reachable range information of the vehicle according to the position information and fuel consumption information of the vehicle; and sending prompt information about the reachable range information of the vehicle.

Optionally, said method further comprises:

obtaining position information of gas stations;

determine whether the vehicle can reach a nearest gas station based on the position information of the gas stations and the reachable range information of the vehicle.

Optionally, said method further comprises:

prompting a user when the vehicle cannot reach the nearest gas station.

Optionally, said method further comprises:

obtaining road-related information;

obtaining the reachable range information of the vehicle based on the position information and the fuel consumption information of the vehicle as well as the road-related information; determining whether the vehicle can reach a nearest gas station based on the position information of the gas stations and the reachable range information of the vehicle.

Optionally, said obtaining the reachable range information of the vehicle based on the position information and the fuel consumption information of the vehicle as well as the road-related information comprises:

obtaining a driving distance $\Delta d$ of the vehicle in a preset period of time, fuel consumption information $\Delta g$ in said preset period of time, and a road-related coefficient j of the current road section, and calculating a current specific fuel consumption from equation 1:

$$h = \Delta g / \Delta d / j \qquad \text{equation 1;}$$

obtaining the reachable range information of the vehicle according to said specific fuel consumption, said position information of the vehicle and to said road-related coefficient using equation 2:

$$h * \Sigma_{i=n}^{1} d_i * j_i = g \qquad \text{equation 2;}$$

wherein, h is the current specific fuel consumption, g is a total amount of the remaining fuel, $d_i$ is a distance that the vehicle can travel on each section of the road, wherein the road is divided into i sections according to the road-related coefficient, $1 \leq i \leq n$ and is an integer, $n \geq 1$ and is an integer, $j_i$ is the road-related coefficient of each section of the road.

Optionally, said method further comprises: obtaining traffic information so as to determine the road-related coefficient.

Optionally, said obtaining traffic information so as to determine the road-related coefficient further comprises:

obtaining road congestion information displayed on a map;

if a section of road is displayed as green in the road congestion information displayed on the basis of a map, setting a congestion coefficient of said section of road as a first congestion coefficient;

if a section of road is displayed as yellow in the road congestion information displayed on the basis of a map, setting a congestion coefficient of said section of road as a second congestion coefficient;

if a section of road is displayed as red in the road congestion information displayed on the basis of a map, setting a congestion coefficient of said section of road as a third congestion coefficient;

if a section of road is displayed as deep red in the road congestion information displayed on the basis of a map, setting a congestion coefficient of said section of road as a fourth congestion coefficient;

wherein the first congestion coefficient<the second congestion coefficient<the third congestion coefficient<the fourth congestion coefficient.

Optionally, said obtaining traffic information so as to determine the road-related coefficient further comprises:

obtaining speed limit information of the road;

if a speed limit value in the speed limit information is greater than or to equal to a second preset threshold but smaller than or equal to a first preset threshold, setting a speed limit coefficient of said section of road as a first speed limit coefficient;

if a speed limit value in the speed limit information is greater than or equal to a third preset threshold but smaller than a second preset threshold, setting a speed limit coefficient of said section of road as a second speed limit coefficient;

if a speed limit value in the speed limit information is greater than or equal to a fourth preset threshold but smaller than a third preset threshold, setting a speed limit coefficient of said section of road as a third speed limit coefficient;

if a speed limit value in the speed limit information is smaller than a fourth preset threshold, setting a speed limit coefficient of said section of road as a fourth speed limit coefficient;

wherein, the first speed limit coefficient<the second speed limit coefficient<the third speed limit coefficient<the fourth speed limit coefficient.

It can be learned from the above technical solutions that embodiments in the present disclosure use a fuel quantity sensor to obtain vehicle fuel consumption information, and use a GPS module to obtain vehicle position information, so that the reachable range information of the vehicle can be obtained from the fuel consumption information and the vehicle position information. In this case, the user can be fully aware of the driving distance that can be supported by the remaining fuel and effective prompt of the fuel quantity is realized. For example, the user can further determine whether the remaining fuel of the vehicle is enough for driving to a destination and thus can further effectively determine whether a refueling is needed.

BRIEF DESCRIPTION OF THE DRAWINGS

To further clarify the technical solutions in the embodiments of the present disclosure or in the prior art, drawings that are to be used for depiction of the embodiments or the prior art will be briefly introduced below. Apparently, said drawings are merely some of the embodiments of the present disclosure, and those skilled in the art can obtain other drawings from these drawings.

DETAILED DESCRIPTION

Technical solutions in the embodiments of the present disclosure will be now described clearly and completely with reference to the drawings. But apparently, the described embodiments are only some, instead of all, of the embodiments of the present disclosure. All other embodiments that can be obtained by those ordinarily skilled in the art on the basis of the embodiments in the present disclosure without using any inventive skill shall fall into the protection scope of the present disclosure.

Figure 1:
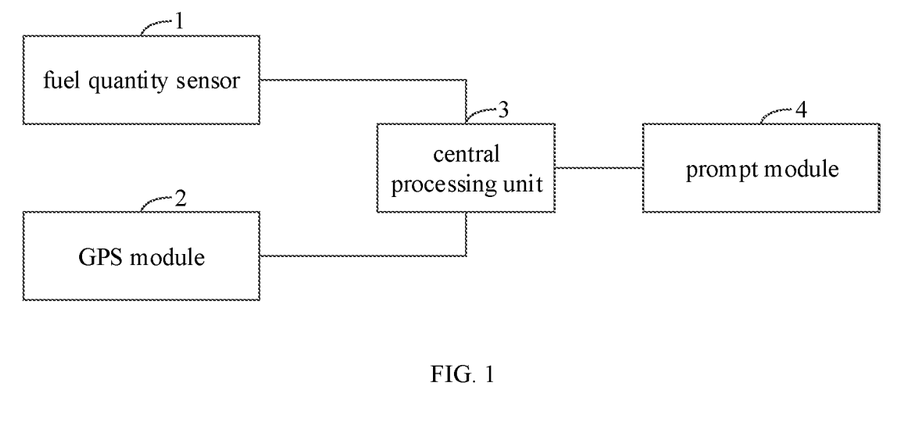
FIG. 1 is a structural diagram of an intelligent fuel prompt device for a vehicle provided by an embodiment of the present disclosure.

FIG. 1 is a structural diagram of an intelligent fuel prompt device for a vehicle provided by an embodiment of the present disclosure. As shown in FIG. 1, said device comprises: a fuel quantity sensor 1, a GPS module 2, a central processing unit 3 and a prompt module 4.

The fuel quantity sensor 1 is configured to obtain fuel consumption information of a vehicle; the GPS module 2 is configured to obtain position information of the vehicle; the central processing unit 3 is configured to obtain reachable range information of the vehicle according to the position information and fuel consumption information of the vehicle; and the prompt module 4 is configured to prompt with respect to the reachable range information of the vehicle.

This embodiment can enable the user to be fully aware of the driving distance that can be supported by the remaining fuel and realize effective prompt of the fuel quantity, for example, enable the user to further determine whether the remaining fuel of the vehicle is enough for driving to a destination and thus can further effectively determine whether a refueling is needed.

The fuel consumption information of the vehicle may comprise: a total amount of the remaining fuel and specific fuel consumption. The total amount of the remaining fuel can be periodically obtained by the sensor in the vehicle and be further transmitted to the central processing unit by Bluetooth, ZIGBEE or wired transmission. The specific fuel consumption, i.e. the fuel consumed per unit distance, can be calculated through h=Δg/Δd, wherein Δd is a driving distance of the vehicle in a preset period of time, Δg is a fuel consumption of the vehicle in the preset period of time.

The central processing unit can obtain the reachable range information of the vehicle based on the total amount of remaining fuel, the specific fuel consumption and the position information of the vehicle. For example, first, a distance that can be covered by the vehicle is obtained according to the total amount of remaining fuel and the specific fuel consumption; then information of roads around the vehicle is obtained according to the position information of the vehicle and based on a map; finally, the reachable range information of the vehicle is obtained according to the distance that can be covered by the vehicle and the information of roads around the vehicle.

Figure 2:
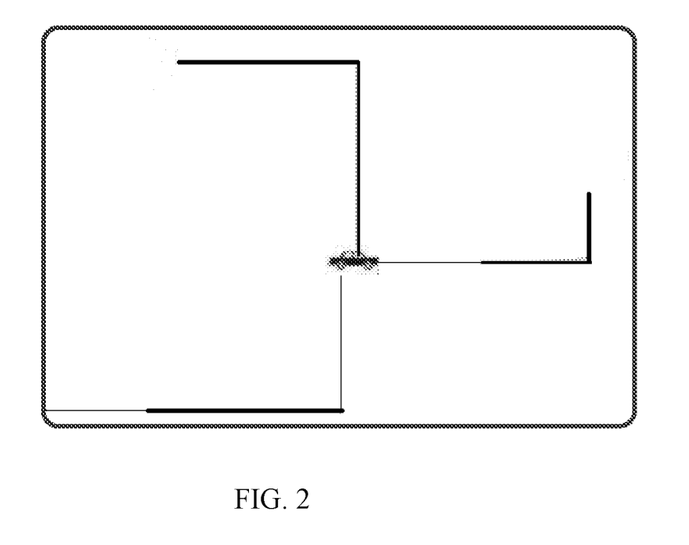
FIG. 2 is schematic drawing of a display of reachable range information of a vehicle provided by an embodiment of the present disclosure.

The prompt module may include a display module. Additionally, the prompt module may also include a voice prompt module. As shown in FIG. 2, the reachable range information of the vehicle may be denoted by a block as shown in FIG. 2 on a map, for example. Additionally, the prompt may be played in real time by voice. Thus effective prompts are given for the distance and range that can be covered by the vehicle with the remaining fuel quantity.

Figure 3:
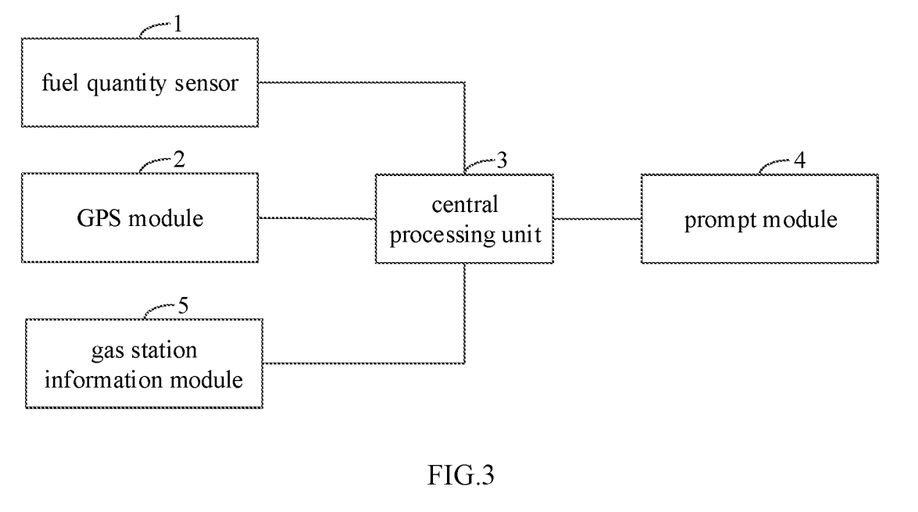
FIG. 3 is a structural diagram of an intelligent fuel prompt device for a vehicle provided by another embodiment of the present disclosure.

FIG. 3 shows a structural diagram of an intelligent fuel prompt device for a vehicle provided by another embodiment of the present disclosure. Said device comprises: a fuel quantity sensor 1, a GPS module 2, a central processing unit 3, a prompt module 4 and a gas station information module 5.

Functions of the fuel quantity sensor 1, the GPS module 2, the central processing unit 3, and the prompt module 4 are similar to those in the embodiment described with reference to FIG. 1, so they will not be elaborated any more.

The gas station information module 5 is configured to obtain position information of gas stations.

Correspondingly, the central processing unit 3 is further configured to determine whether the vehicle can reach a nearest gas station based on the position information of the gas stations and the reachable range information of the vehicle.

Specifically, said determining whether the vehicle can reach a nearest gas station based on the position information of the gas stations and the reachable range information of the vehicle may include:

obtaining a gas station nearest to the vehicle according to the position information of the gas stations; obtaining a distance between said vehicle and said nearest gas station; determining whether a difference between the distance that can be covered by the vehicle as indicated in the reachable range information of the vehicle and the distance between said vehicle and said nearest gas station is smaller than or equal to the first preset threshold; or obtaining a gas station nearest to the vehicle according to the position information of the gas stations; obtaining a fuel quantity needed for the vehicle to reach said nearest gas station; determining whether a difference between the total amount of remaining fuel of the vehicle and said needed fuel quantity is smaller than or equal to a second preset threshold.

The prompt module 4 is further configured to prompt the user when the vehicle cannot reach the nearest gas station. Specifically, when the difference between the distance that can be covered by the vehicle and the distance between said vehicle and said nearest gas station is smaller than or equal to the first preset threshold, the user is prompted; or when the difference between the total amount of remaining fuel of the vehicle and the fuel quantity needed for the vehicle to reach the nearest gas station is smaller than or equal to a second preset threshold, the user is prompted. Therefore, the user can be reminded in time so as to avoid running out of fuel in places with sparse gas stations.

The prompt module 4 can prompt the user by means of buzzing, vibration or flashing lights, etc.

Figure 4:
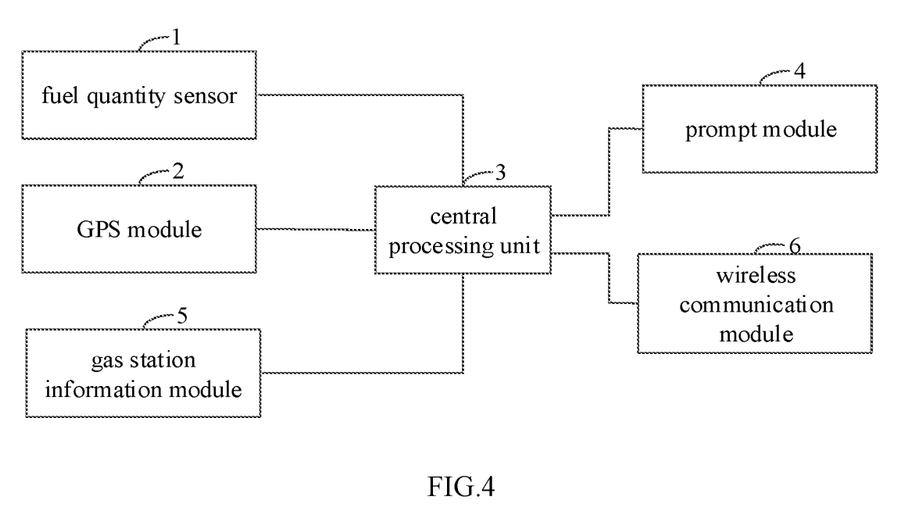
FIG. 4 is a structural diagram of an intelligent fuel prompt device for a vehicle provided by still another embodiment of the present disclosure.

In the present embodiment, the central processing unit 3 can determine whether gas stations exist in the reachable range of the vehicle according to the position information of gas stations and the reachable range information of the vehicle, and can detect in real time whether the remaining fuel of the vehicle can support driving to the nearest gas station. If no, a timely and effective prompt will be issued to the user so that the user can take emergent preventive measures, such as non-conventional measures like stepping on the gas lightly to save fuel, neutral taxiing or borrowing fuel from other vehicles FIG. 4 is a structural diagram of an intelligent fuel prompt device for a vehicle provided by still another embodiment of the present disclosure. As shown in FIG. 4, said device comprises: a fuel quantity sensor 1, a GPS module 2, a central processing unit 3, a prompt module 4, a gas station information module 5 and a wireless communication module 6.

Functions of the fuel quantity sensor 1, the GPS module 2, the central processing unit 3, the prompt module 4 and the gas station information module 5 are similar to those described in the above embodiment, so they will not be elaborated any more.

The wireless communication module 6 is configured to obtain position information of gas stations in real time and send said position information of gas stations to the gas station information module 5. Thus the wireless communication module can update the position information of gas stations stored in the gas station information module 5, so that the position information of gas stations in the gas station information module 5 can always be up-to-date and accurate.

Said wireless communication module 6 can also be configured to obtain road-related information and send said road-located information to the central processing unit 3.

Correspondingly, the central processing unit 3 can be used to obtain the reachable range information of the vehicle based on the position information and fuel consumption information of the vehicle as well as the road-related information; and determine whether the vehicle can reach a nearest gas station based on the position information of the gas stations and the reachable range information of the vehicle.

In this embodiment, since the road-related information include, for example, road congestion information, speed limit information, etc., the central processing unit 3 calculating the reachable range of the vehicle specifically includes:

obtaining a driving distance Δd of the vehicle in a preset period of time, fuel consumption information Δg in said preset period of time, and a road-related coefficient j of the current road section, and calculating a current specific fuel consumption from equation 1:

$$h = \Delta g / \Delta d / j \quad (1)$$

obtaining the reachable range information of the vehicle according to said specific fuel consumption, said position information of the vehicle and said road-related coefficient using equation 2:

$$h * \Sigma_{i=n}^{1} d_i * j_i = g \quad (2)$$

wherein, h is the current specific fuel consumption, g is a total amount of the remaining fuel, $d_i$ is a distance that the vehicle can travel on each section of the road, wherein the road is divided into i sections according to the road-related coefficient, $1 \leq i \leq n$ and is an integer, $n \geq 1$ and is an integer, $j_i$ is the road-related coefficient of each section of the road, and $d_i$ can be used to represent the reachable range information of the vehicle.

Optionally, the road-related coefficient is a congestion coefficient.

Figure 5:
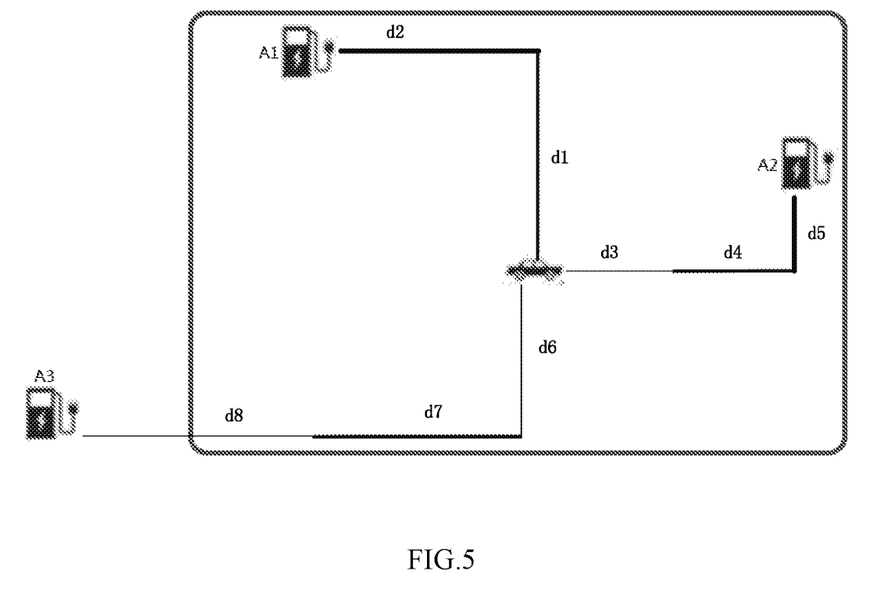
FIG. 5 is schematic drawing of a display of reachable range information of a vehicle and gas station position information provided by another embodiment of the present disclosure.

When the road-related coefficient is a congestion coefficient, said dividing the road into i sections according to the road-related coefficient specifically includes: obtaining road congestion information displayed on the basis of a map on which different colors are used to denote different road congestion conditions on the map, for instance, red denoting serious congestion, yellow denoting slow driving, green denoting clear traffic, and so on, and then dividing the road into i sections according to the displayed colors that are corresponding to the road congestion information. For example, as shown in FIG. 5, the road from the vehicle to gas station A1 is divided into two sections d1 and d2 according to the colors, i.e. the color corresponding to d1 is different from the color corresponding to d2. Likewise, the road from the vehicle to gas station A2 is divided into three sections d3, d4 and d5 according to the colors, and the road from the vehicle to gas station A3 is also divided into three sections d6, d7 and d8 according to the colors.

Roads around the vehicle are searched in terms of breadth according to the above-mentioned equation (2). The reachable range information of the vehicle refers to driving distances that can be supported by the total amount of remaining fuel of the vehicle on each of the multiple roads available for traveling by the vehicle from its current position.

As shown in FIG. 5, the prompt module 4 can prompt with respect to the reachable range of the vehicle, the position information of the vehicle and the position information of gas stations. The block in FIG. 5 shows the reachable range of the vehicle, and in different directions, the road can be divided into multiple sections according to the congestion coefficient. For example, the road heading to the north is divided into the two sections of d1 and d2, the road heading to the west is divided into the three sections of d3, d4 and d5, and the road heading to the east is also divided into the three sections of d6, d7 and d8. Apparently, the vehicle can reach the two gas stations A1 and A2 if heading to the north or the east, while the vehicle cannot reach gas station A3 if heading to the west. According to the information shown in the figure, the user can conveniently determine whether a refueling is needed and which gas station should be chosen for refueling.

Optionally, the road-related coefficient can also be a speed limit coefficient.

When the road-related coefficient is a speed limit coefficient, said dividing the road into i sections according to the road-related coefficient specifically includes: obtaining speed limit information based on the map, i.e. different road sections have different speed limits, for example, the speed limits for different road sections are 20 km/h, 30 km/h, 40 km/h, 60 km/h, etc.; and then dividing the road into i sections according to different speed limits. For example, as shown in FIG. 5, the road from the vehicle to gas station A1 is divided into two sections d1 and d2 according to the speed limits, namely, d1 and d2 correspond to different speed limits. Likewise, the road from the vehicle to gas station A2 is divided into three sections d3, d4 and d5 according to the speed limits, and the road from the vehicle to gas station A3 is also divided into three sections d6, d7 and d8 according to the speed limits.

In the intelligent fuel prompt device provided in this embodiment, road-related information, such as road congestion information, speed limit information, etc., are obtained through the wireless communication module 6, and the central processing unit 3 will take the road-related information into account when calculating the reachable range of the vehicle, thereby enabling the device to determine the fuel consumption condition of the vehicle more accurately.

Figure 6:
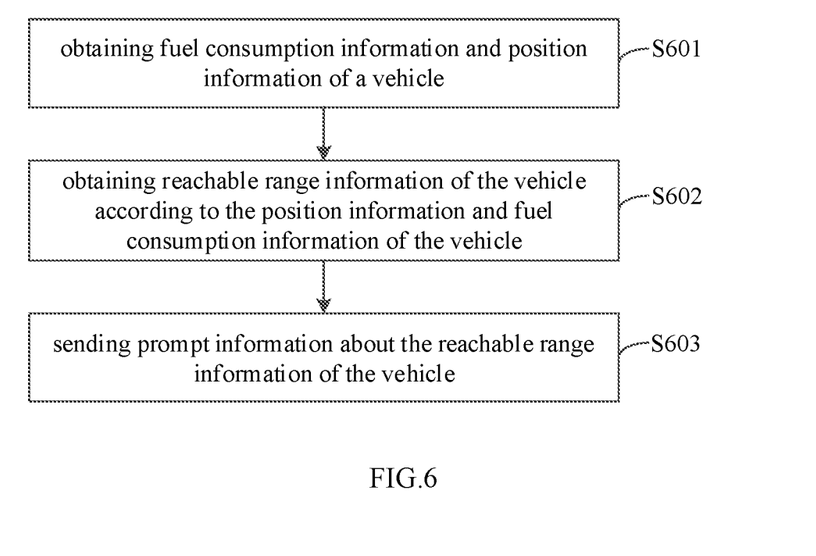
FIG. 6 is a flow chart of an intelligent fuel prompt method for a vehicle provided by an embodiment of the present disclosure.

As shown in FIG. 6, the present disclosure provides an intelligent fuel prompt method for a vehicle, which comprises:

S601: obtaining fuel consumption information and position information of a vehicle;

S602: obtaining reachable range information of the vehicle according to the position information and fuel consumption information of the vehicle;

S603: sending prompt information about the reachable range information of the vehicle.

Prompting the user with respect to the reachable range information of the vehicle includes, for example, prompting the user by voice information and/or prompting the user by image information.

In the intelligent fuel prompt method provided by the present embodiment, by means of the reachable range information of the vehicle obtained according to the fuel consumption information and vehicle position information, the user can be fully aware of the driving distance that can be supported by the remaining fuel quantity, thus effective prompt about the fuel quantity can be realized, for example, the user is enabled to further effectively determine whether a refueling is needed.

Figure 7:
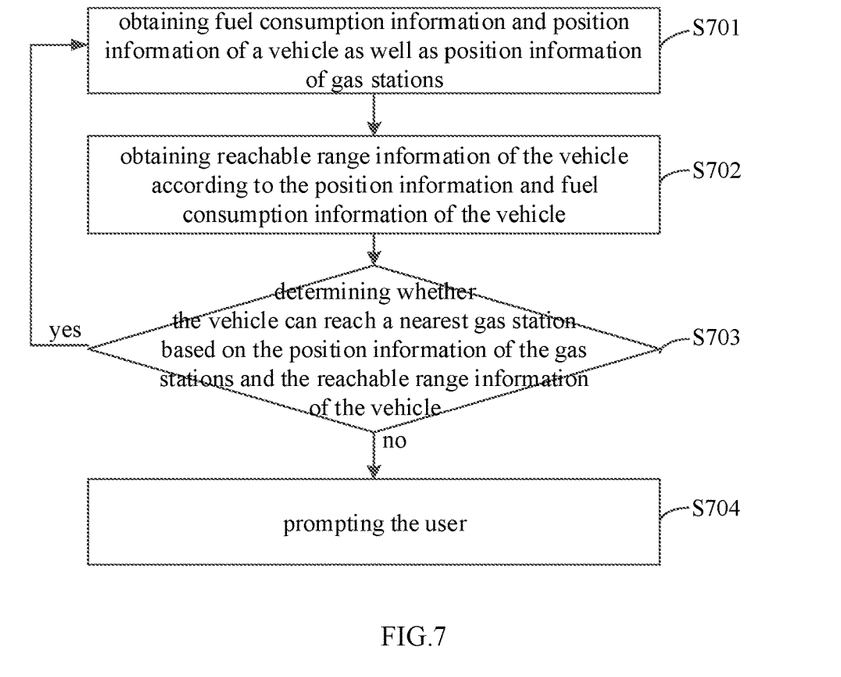
FIG. 7 is a flow chart of an intelligent fuel prompt method for a vehicle provided by another embodiment of the present disclosure.

FIG. 7 is a flow chart of an intelligent fuel prompt method for a vehicle provided by another embodiment of the present disclosure.

S701: obtaining fuel consumption information and position information of a vehicle as well as position information of gas stations; compared to step S601 in the embodiment shown in FIG. 6, this step further needs to obtain position information of gas stations, which can be stored in a local device or be updated in real time through a network;

S702: obtaining reachable range information of the vehicle according to the position information and fuel consumption information of the vehicle;

S703: determining whether the vehicle can reach a nearest gas station based on the position information of the gas stations and the reachable range information of the vehicle.

Optionally, said determining whether the vehicle can reach a nearest gas station may include:

obtaining a distance between said vehicle and said nearest gas station;

determining whether a difference between the distance that can be covered by the vehicle as indicated in the reachable range information of the vehicle and the distance between said vehicle and said nearest gas station is smaller than or equal to the first preset threshold; or obtaining a fuel quantity needed for the vehicle to reach said nearest gas station; determining whether a difference between the total amount of remaining fuel of the vehicle and said needed fuel quantity is smaller than or equal to the second preset threshold.

S704: prompting the user when the vehicle cannot reach the nearest gas station.

It shall be noted that when the vehicle can reach the nearest gas station, it is returned to step S701 to continue to perform detection and determination of the fuel quantity, i.e. to perform real-time detection and determination of the fuel quantity.

When the vehicle cannot reach the nearest gas station, the user is prompted. Specifically, the user is prompted when the difference between the distance that can be covered by the vehicle as indicated in the reachable range information of the vehicle and the distance between said vehicle and said nearest gas station is smaller than or equal to the first preset threshold; or the user is prompted when the difference between the total amount of remaining fuel of the vehicle and said needed fuel quantity is smaller than or equal to the second preset threshold. In this case, the user can be prompted in time to avoid running out of fuel in places with sparse gas stations.

In this embodiment, the position information of gas stations is further obtained. Then, it is determined whether gas stations exist in the reachable range of the vehicle according to the position information of gas stations and the reachable range information of the vehicle, and it is detected in real time whether the remaining fuel of the vehicle can support driving to the nearest gas station. If no, a timely and effective prompt will be issued to the user so that the user can refuel the vehicle in time.

Figure 8:
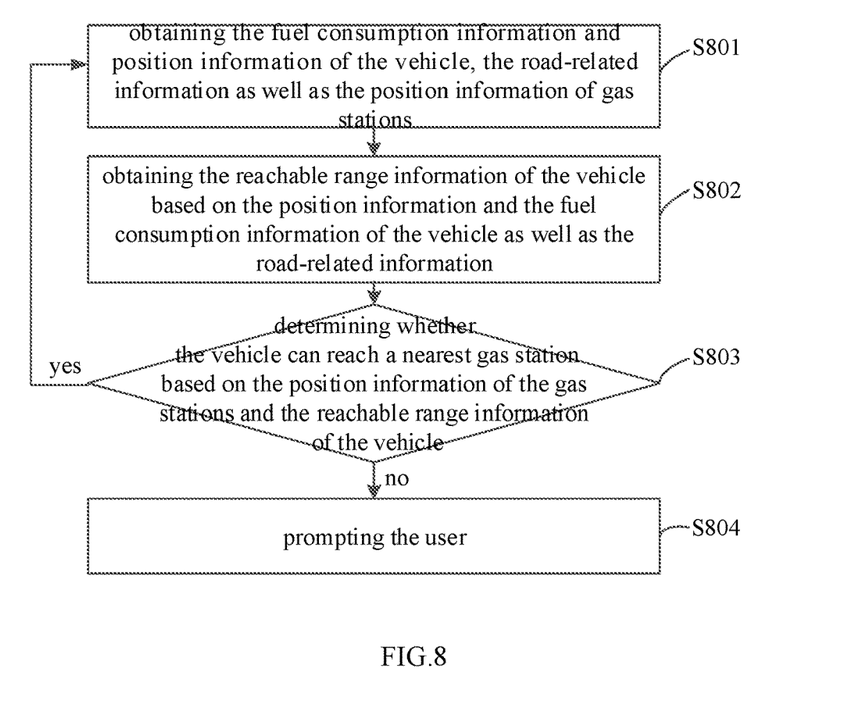
FIG. 8 is a flow chart of an intelligent fuel prompt method for a vehicle provided by still another embodiment of the present disclosure.

FIG. 8 shows a flow chart of an intelligent fuel prompt method for a vehicle provided by still another embodiment of the present disclosure. As shown in FIG. 8, said method further comprises the following steps:

S801: obtaining the fuel consumption information and position information of the vehicle, the road-related information as well as the position information of gas stations.

Compared to the step S701 in the embodiment shown in FIG. 7, this step further needs to obtain the road-related information. For example, the congestion coefficients of the current road sections obtained through the network can be used as the road-related information, or the speed limit information of the road sections obtained through the network can be used as the road-related information.

S802: obtaining the reachable range information of the vehicle based on the position information and the fuel consumption information of the vehicle as well as the road-related information;

S803: determining whether the vehicle can reach a nearest gas station based on the position information of the gas stations and the reachable range information of the vehicle.

S804: prompting the user when the vehicle cannot reach the nearest gas station.

Said obtaining the reachable range information of the vehicle based on the position information and fuel consumption information of the vehicle as well as the road-related information can be specifically realized by the following method:

obtaining a driving distance $\Delta d$ of the vehicle in a preset period of time, fuel consumption information $\Delta g$ in said preset period of time, and a road-related coefficient j of the current road section, and calculating a current specific fuel consumption from equation 1:

$$h = \Delta g / \Delta d / j \quad \text{equation 1;}$$

obtaining the reachable range information of the vehicle according to said specific fuel consumption, said position information of the vehicle and said road-related coefficient using equation 2:

$$h * \Sigma_{i=n}^{1} d_i * j_i = g \quad \text{equation 2;}$$

wherein, h is the current specific fuel consumption, g is a total amount of the remaining fuel, $d_i$ is a distance that the vehicle can travel on each section of the road, wherein the road is divided into i sections according to the road-related coefficient, $1 \leq i \leq n$ and is an integer, $n \geq 1$ and is an integer, $j_i$ is the road-related coefficient of each section of the road, $d_i$ can be used to represent the reachable range information of the vehicle.

In this embodiment, said method further comprises: obtaining traffic information so as to determine the road-related coefficient.

Further, said obtaining traffic information so as to determine the road-related coefficient comprises:

obtaining road congestion information displayed on a map;

if a section of road is displayed as green in the road congestion information displayed on the basis of a map, setting a congestion coefficient of said section of road as a first congestion coefficient;

if a section of road is displayed as yellow in the road congestion information displayed on the basis of a map, setting a congestion coefficient of said section of road as a second congestion coefficient;

if a section of road is displayed as red in the road congestion information displayed on the basis of a map, setting a congestion coefficient of said section of road as a third congestion coefficient;

if a section of road is displayed as deep red in the road congestion information displayed on the basis of a map, setting a congestion coefficient of said section of road as a fourth congestion coefficient;

wherein the first congestion coefficient<the second congestion coefficient<the third congestion coefficient<the fourth congestion coefficient.

It can be seen that the higher the degree of road congestion is, the higher the congestion coefficient is set.

For example, when a section of road is displayed as green on the map, the congestion coefficient j is 1; when a section of road is displayed as yellow on the map, the congestion coefficient j is 1.1; when a section of road is displayed as red on the map, the congestion coefficient j is 1.2; when a section of road is displayed as deep red on the map, the congestion coefficient j is 1.3.

Further, said obtaining traffic information so as to determine the road-related coefficient further comprises:

obtaining speed limit information of the road;

if a speed limit value in the speed limit information is greater than or equal to a second preset threshold but smaller than or equal to a first preset threshold, setting a speed limit coefficient of said section of road as a first speed limit coefficient;

if a speed limit value in the speed limit information is greater than or equal to a third preset threshold but smaller than a second preset threshold, setting a speed limit coefficient of said section of road as a second speed limit coefficient;

if a speed limit value in the speed limit information is greater than or equal to a fourth preset threshold but smaller than a third preset threshold, setting a speed limit coefficient of said section of road as a third speed limit coefficient;

if a speed limit value in the speed limit information is smaller than a fourth preset threshold, setting a speed limit coefficient of said section of road as a fourth speed limit coefficient;

wherein, the first speed limit coefficient<the second speed limit coefficient<the third speed limit coefficient<the fourth speed limit coefficient. It shall be appreciated that this embodiment only describes the setting of the speed limit coefficient by way of examples, and when the speed limit value satisfies more conditions than the above-mentioned four conditions, the above method is still applicable, and it will not be elaborated herein any more.

For example, the first preset threshold is 90 km/h, the second preset threshold is 70 km/h, the third preset threshold is 50 km/h and the fourth present threshold is 30 km/h. If the speed limit of the current section of road is 80 km/h, then the speed limit coefficient j is 1; if the speed limit of the current section of road is 60 km/h, then the speed limit coefficient j is 1.1; if the speed limit of the current section of road is 30 km/h, then the speed limit coefficient is 1.4; and if the speed limit of the current section of road is 20 km/h, then the speed limit coefficient j is 1.5.

Since the method embodiments are basically similar to the device embodiments, they are described briefly, and reference can be made to the device embodiments herein.

It shall also be noted that in this text, relational terms like first and second are merely used to differentiate one entity or operation from another entity or operation, but they do not necessarily require or suggest that such actual relationship or sequence exist between said entities or operations. Besides, terms "include" and "comprise" or any variants thereof intend to mean non-exclusive inclusion, so that the process, method, article or device including a series of elements further includes other elements that are not explicitly listed in addition to said series of elements, or further include elements inherent to said process, method, article or device. Unless otherwise defined specifically, the element defined by such sentence as "includes one . . . " does not exclude the case that the process, method, article or device including said element further includes other identical elements.

The above embodiments are described as examples of the present disclosure, which do not intend to limit the protection scope of the present disclosure. Those skilled in the art can modify the technical solutions disclosed in the above embodiments or equivalently substitute some of the technical features thereof, while such modifications or substitutions do not depart from the spirit and scope of the present disclosure.

The invention claimed is:

1. An intelligent fuel prompt device for a vehicle, comprising:
    a sensor configured to obtain fuel consumption information of a vehicle;
    a GPS receiver configured to obtain position information of the vehicle;
    a processor configured to obtain reachable range information of the vehicle according to the position information and fuel consumption information of the vehicle;
    a prompt module configured to prompt with respect to the reachable range information of the vehicle;
    a gas station information receiver configured to obtain position information of gas stations;
    wherein the processor is further configured to determine whether the vehicle is able to reach a nearest gas station based on the position information of the gas stations and the reachable range information of the vehicle;
    wherein the prompt module is further configured to prompt a user in response to the vehicle not being able to reach the nearest gas station;
    wherein the processor is configured to:
    obtain a driving distance $\Delta d$ of the vehicle in a preset period of time, fuel consumption information $\Delta g$ in said preset period of time, and a road-related coefficient j of the current road section, and calculate a current specific fuel consumption from equation 1:

$$h = \Delta g / \Delta d / j \qquad \text{equation 1;}$$

obtain the reachable range information of the vehicle according to said specific fuel consumption, said position information of the vehicle and said road-related coefficient using equation 2:

$$h * \Sigma_{i=n}^{1} d_i * j_i = g \qquad \text{equation 2;}$$

wherein, h is the current specific fuel consumption, g is a total amount of the remaining fuel, $d_j$ is a distance that the vehicle can travel on each section of the road, wherein the road is divided into i sections according to the road-related coefficient, $1 \leq i \leq n$ and is an integer, $n \geq 1$ and is an integer, $j_j$ is the road-related coefficient of each section of the road.

2. The device according to claim 1, which further comprises a wireless communication module configured to obtain position information of gas stations in real time and send said position information of gas stations to the gas station information receiver.

3. The device according to claim 2, wherein the wireless communication module is further configured to obtain road-related information and send said road-related information to the processor.

4. The device according to claim 1, wherein the road-related coefficient comprises a congestion coefficient.

5. The device according to claim 1, wherein the road-related coefficient comprises a speed limit coefficient.

6. An intelligent fuel prompt method for a vehicle, comprising:
    obtaining fuel consumption information and position information of a vehicle;
    obtaining road-related information;
    obtaining the reachable range information of the vehicle based on the position information and the fuel consumption information of the vehicle as well as the road-related information;
    obtaining position information of gas stations;
    determining whether the vehicle is able to reach a nearest gas station based on the position information of the gas stations and the reachable range information of the vehicle;
    prompting a user in response to the vehicle not being able reach the nearest gas station;
    wherein obtaining the reachable range information of the vehicle based on the position information and the fuel consumption information of the vehicle as well as the road-related information comprises:

obtaining a driving distance Δd of the vehicle in a preset period of time, fuel consumption information Δg in said preset period of time, and a road-related coefficient j of the current road section, and calculating a current specific fuel consumption from equation 1:

$$h = \Delta g / \Delta d / j \qquad \text{equation 1;}$$

obtaining the reachable range information of the vehicle according to said specific fuel consumption, said position information of the vehicle and said road-related coefficient using equation 2:

$$h * \Sigma_{i=n}^{1} d_i * j_i = g \qquad \text{equation 2;}$$

wherein, h is the current specific fuel consumption, g is a total amount of the remaining fuel, $d_j$ is a distance that the vehicle can travel on each section of the road, wherein the road is divided into i sections according to the road-related coefficient, 1≤i≤n and is an integer, n≥1 and is an integer, $j_j$ is the road-related coefficient of each section of the road.

7. The method according to claim 6, wherein said method further comprises: obtaining traffic information so as to determine the road-related coefficient.

8. The method according to claim 7, wherein obtaining traffic information so as to determine the road-related coefficient further comprises:

obtaining road congestion information displayed on a map;

if a section of road is displayed as green in the road congestion information displayed on the basis of a map, setting a congestion coefficient of said section of road as a first congestion coefficient;

if a section of road is displayed as yellow in the road congestion information displayed on the basis of a map, setting a congestion coefficient of said section of road as a second congestion coefficient;

if a section of road is displayed as red in the road congestion information displayed on the basis of a map, setting a congestion coefficient of said section of road as a third congestion coefficient;

if a section of road is displayed as deep red in the road congestion information displayed on the basis of a map, setting a congestion coefficient of said section of road as a fourth congestion coefficient;

wherein the first congestion coefficient<the second congestion coefficient<the third congestion coefficient<the fourth congestion coefficient.

9. The method according to claim 7, wherein obtaining traffic information so as to determine the road-related coefficient further comprises:

obtaining speed limit information of the road;

if a speed limit value in the speed limit information is greater than or equal to a second preset threshold but smaller than or equal to a first preset threshold, setting a speed limit coefficient of said section of road as a first speed limit coefficient;

if a speed limit value in the speed limit information is greater than or equal to a third preset threshold but smaller than a second preset threshold, setting a speed limit coefficient of said section of road as a second speed limit coefficient;

if a speed limit value in the speed limit information is greater than or equal to a fourth preset threshold but smaller than a third preset threshold, setting a speed limit coefficient of said section of road as a third speed limit coefficient;

if a speed limit value in the speed limit information is smaller than a fourth preset threshold, setting a speed limit coefficient of said section of road as a fourth speed limit coefficient;

wherein, the first speed limit coefficient<the second speed limit coefficient<the third speed limit coefficient<the fourth speed limit coefficient.

10. The method according to claim 6, wherein the road-related coefficient comprises a congestion coefficient.

11. The method according to claim 6, wherein the road-related coefficient comprises a speed limit coefficient.

\* \* \* \* \*